J. J. BISEL.

Assignor by mesne assignments to J. S. MARSH and W. W. WOLFE.

REVOLVING STANDS.

No. 7,437. Reissued Dec. 19, 1876.

Witnesses:

P. C. Dieterich

Wm. Ruffner

Inventor:

Jos. J. Bisel

Per: C. A. Watson & Co. Attorneys.

THE GRAPHIC CO. N.Y.

UNITED STATES PATENT OFFICE.

JOSEPH J. BISEL, OF LEWISBURG, PENNSYLVANIA, ASSIGNOR, BY MESNE ASSIGNMENTS, TO JAMES S. MARSH AND W. W. WOLFE.

IMPROVEMENT IN REVOLVING STANDS.

Specification forming part of Letters Patent No. 138,226, dated April 29, 1873; reissue No. 7,437, dated December 19, 1876; application filed September 25, 1876.

*To all whom it may concern:*

Be it known that I, JOSEPH J. BISEL, of Lewisburg, in the county of Union and State of Pennsylvania, have invented certain new and useful Improvements in Revolving Stands; and I do hereby declare that the following is a full, clear, and exact description thereof, that will enable others skilled in the art to which it appertains to make and use the same, reference being had to the accompanying drawing, and to the letters of reference marked thereon, which form a part of this specification.

The nature of my invention consists in the construction and arrangement of a device for exhibiting dry-goods and other articles, as will be hereinafter more fully set forth.

Figure 1:
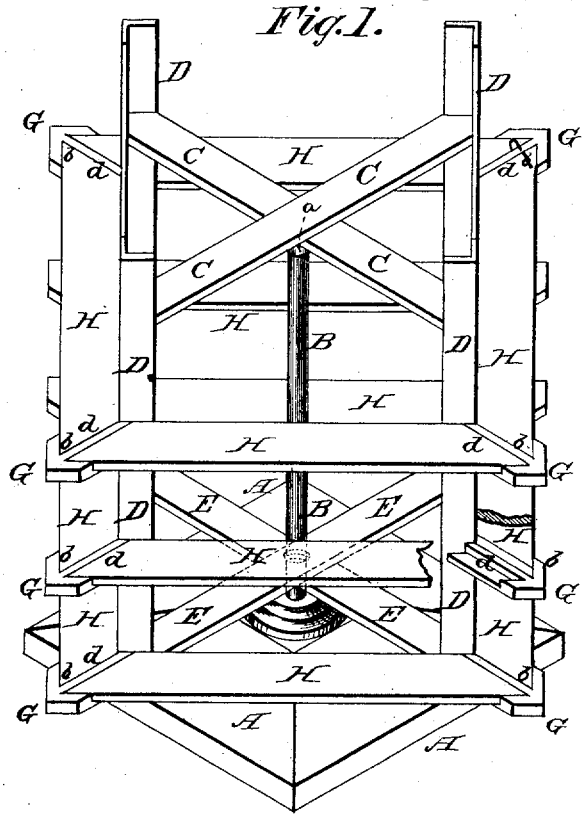
Figure 2:
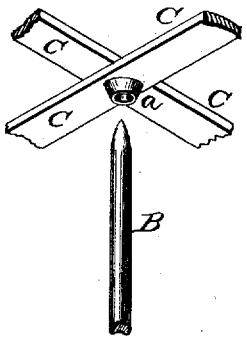

In the annexed drawing, Figure 1 is a perspective view of the entire device, and Fig. 2 shows a detached part of the same.

A represents a foot or platform of any suitable dimensions, form, and shape, and from the center of which rises a stationary rod, B. Upon the stand thus formed is placed a revolving structure, constructed in the following manner: D D represent four upright angular or L-shaped bars, which form the corners of the revolving structure, said bars being connected, at or near their upper ends, by two diagonal bars, C C, and at or near their lower ends by two other diagonal bars, E E. In the center of the bars E E, where the same cross each other, is made a hole of sufficient size for the rod B to pass through, and on the under side of the bars C C, where the same cross each other, is formed or attached a hollow conical bearing, *a*, into which fits the upper pointed end of the rod B. The entire frame C D E is thus supported and pivoted upon the end of the rod B, and can readily be revolved on the same, so as to bring either side of the frame to the front. Upon the outer side of each of the bars D are secured supports G G for the shelves H H. The supports G G are flat bars extending outward from the corners of the frame on a line with the central rod, and their outer ends are cut off in L shape, to correspond with the shape of the corner bars of the frame. At the outer end of each support G is an inward-projecting flange, *b*, and in the center of the support is another flange, *d*, dividing each support into two spaces, to receive the adjoining ends of the shelves on contiguous sides. The ends of the shelves H H are cut on an angle of forty-five degrees, so as to fit on the supports G G, as shown in Fig. 1.

This device may be placed in a show-window or on the counter, and dry-goods or other articles placed on the shelves for exhibition. The frame, with the shelves, revolves on the rod B without almost any friction, and thus any side may be brought in view without the least trouble.

Having thus fully described my invention, what I claim as new, and desire to secure by Letters Patent, is—

1. A revolving frame provided with vertical supports D, shelves H, inside connecting parts C E, in combination with a bottom support, A, and central rod B, substantially as and for the purpose set forth.

2. The revolving frame consisting of the angular or L-shaped corner-bars D D, with diagonal connecting-bars C C and E E, and provided with shelves around its outside, for the purposes herein set forth.

3. The combination of the stand A B, revolving frame C D E, supports G G, and shelves H H, all constructed and arranged substantially as and for the purposes herein set forth.

In testimony that I claim the foregoing I have hereunto set my hand this 13th day of October, 1876.

JOSEPH J. BISEL.

Witnesses:
J. C. REESER,
W. W. WOLFE.